United States Patent Office 3,116,276
Patented Dec. 31, 1963

3,116,276
WATER-INSOLUBLE METALLIFEROUS AZO-DYE-STUFFS AND A PROCESS FOR THEIR MANUFACTURE
Richard Gross, Frankfurt am Main, and Hasso Hertel, Reinhard Mohr, and Walter Staab, Offenbach (Main), Germany, assignors to Farbwerke Hoechst Aktiengesellschaft vormals Meister Lucius & Brüning, Frankfurt am Main, Germany, a corporation of Germany
No Drawing. Filed Jan. 4, 1961, Ser. No. 80,521
Claims priority, application Germany Jan. 7, 1960
6 Claims. (Cl. 260—146)

The present invention provides new water-insoluble metalliferous azo-dyestuffs and a process for their manufacture; more particularly it provides new complex metal compounds of water-insoluble azo-dyestuffs having the general formula

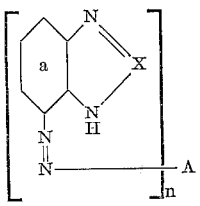

wherein X stands for a nitrogen atom or the groups CH, C-alkyl or C-aryl, the benzene nucleus $a$ may be substituted by groups which do not impart sobulility in water, A represent the radical of a coupling component coupling in a position adjacent to the hydroxy group and $n$ represents the integer 1 or 2.

The invention is based on the observation that new water-insoluble metalliferous azo-dyestuffs are obtained by coupling in substance, on the fiber or on another substratum the diabonium compounds of amines having the general formula

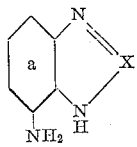

wherein X stands for a nitrogen atom or the groups CH, C-alkyl or C-aryl, and the benzene nucleus $a$ may be substituted by groups which do not impart solubility in water, with coupling components being free from sulfonic acid or carboxylic acid groups coupling in a position adjacent to the hydroxy group, and treating the dyestuffs so obtained with agents yielding metal.

As diazo components there are used for the process of the present invention 7-amino-benzimidazoles and 7-amino-benztriazoles having the above formula which may contain in the benzene nucleus $a$, for example, halogen atoms, nitro, alkyl, alkoxy or acylamino groups.

As coupling components there may be used for the process of the present invention compounds coupling in a position adjacent to the hydroxy group, i.e. aromatic or heterocyclic hydroxy compounds and compounds containing a enolizable or enolized ketomethylene group being in a heterocyclic ring. Such compounds are, for example, derivatives of the phenol substituted in 4-position, for example, para-cresol, para-chlorophenol, 4-hydroxy-1.2-xylene, 4-hydroxy-acetophenone and hydroquinone-monomethylether, the derivatives of the α-naphthol substituted in 4-position, for example, 4-chloro-1-naphthol, 4-methoxy-1-naphthol and 4-benzoyl-1-naphthol, furthermore, β-naphthol and its derivatives, for example, 6-bromo-2-naphthol, 7-hydroxy-2-methoxy-naphthalene, 1-benzoylamino-7-naphthol and 4-phenylazo-1-amino-7-naphthol, as well as resorcine, benzoyl-resorcine, 2.6-dihydroxy-naphthalene, 3.6-dihydroxy-diphenylene oxide, 6-hydroxy-quinoline, 2-hydroxycarbazole, 3-hydroxydiphenylene oxide, 2.4-dihydroxyquinoline and 1-aryl-3-methyl-5-pyrazolone, especially, however, arylamides of aromatic or heterocyclic ortho-hydroxycarboxylic acids or of acylacetic acids, for example, of the 2.3-hydroxynaphthoic acid or its derivatives substituted in 6-position, of the 2-hydroxyanthracene-3-carboxylic acid, of the 3-hydroxydiphenylene oxide-2-carboxylic acid, of the 2-hydroxycarbazole, 3-carboxylic acid, of the 5-hydroxy-1.2.1′.2′-benzocarbazole-4-carboxylic acid, of the acetoacetic acid, of the benzoylacetic acid or of the terepththaloyl-bisacetic acid.

The production of the dyestuffs may be carried out in different ways. Vegetable fibers, including fibers of regenerated cellulose, for example, may be impregnated with the alkaline solutions of the coupling components and the excess of these solutions be drained off by expressing or centrifuging. After an eventual intermediate drying of the impregnated colored articles the formation of dyestuffs may be carried out in the usual manner in a developing bath containing the diazo compound of one of the amines used according to the present invention.

The metallization of the coupling components may already be carried out in the developing bath by adding to the bath, before or during the coupling, agents yielding metal and by completing the metallization by raising the temperature.

The metallization may, however, also be carried out after the formation of dyestuff in a second bath which is neutral, weakly alkaline or weakly acid and which, besides compounds yielding metal, may contain dispersing agents or detergents, for example, a fatty alcohol polyglycol ether, an alkylphenol polyglycol ether, an alkylnaphthol polyglycol ether, a fatty acid polyglycol ester or a fatty acid amide polyglycol ether.

When the process is carried out in an appropriate manner the new dyestuffs can also be produced on animal fibers, such as wool and silk, or on synthetic fibers such as polyamide or polyvinyl alcohol fibers.

The dyestuff can also be prepared in substance and converted into complex metal compounds by treatment with agents yielding metal. The dyestuffs so obtained are suitable for dyeing synthetic fibers or for coloring organic plastic masses of high molecular weight.

As agents yielding metal, there are preferably used for the process of the present invention compounds yielding copper, cobalt, nickel, manganese, zinc or iron which may be used in the form of their inorganic or organic salts such, for example, as chlorides, bromides, sulfates, nitrates, formates or acetates, or as complex compounds, of these metals especially with hydroxyalkylamines such, for example, as diethanolamine, triethanolamine or N-methylethanolamine or with aminocarboxylic acids such as aminoacetic acid or nitrilotriacetic acid, with aliphatic hydroxycarboxylic acids, such as citric acid, tartaric acid, gluconic acid or glycolic acid, with alkali metal phosphates, such as alkali metal pyrophosphates or alkali metal polyphosphates. When an agent yielding cobalt is used, the addition of compounds of hexavalent chromium or other oxidizing agents, for example, alkali metal perborates, alkali metal persulfates or alkali metal percarbonates has an advantageous effect on the metallization.

On vegetable fibers there are obtained by the process according to the present invention dyestuffs which possess in addition to good general properties of fastness very good fastness to light.

The following Examples serve to illustrate the invention, the parts being by weight unless otherwise stated, and the relationship of parts by weight to parts by volume being the same as that of the kilogram to the liter:

EXAMPLE 1

Cotton fabric was padded on the foulard with the following solution and dried:

14.4 grams of β-naphthol were pasted up with 30 grams of Monopol Brilliant Oil and 10 cc. of sodium hydroxide solution of 38° Bé. and made up to 1 liter with boiling water containing, per liter, 3 grams of tragacanth as thickening agent.

The dried fabric was developed on the foulard for 15 to 20 minutes at 20° C. and after slowly heating to 95° C., for 20 to 30 minutes at this temperature in the long liquor described below. Then the material was rinsed with a solution containing, per liter of water, 3 cc. of hydrochloric acid of 20° Bé., saponified for 15 minutes at 60° C. with a solution containing 2 grams of soap, per liter of water, rinsed again and dried.

0.8 gram of 7-amino-2.5-dimethyl-benzimidazole in the form of a diazonium compound prepared in the usual manner, were dissolved in 1 liter of water containing 2 grams of a reaction product from about 20 mols of ethylene oxide and 1 mol of octadecyl alcohol, 1 cc. of acetic acid of 50% strength, 7 grams of sodium acetate and 1.25 grams of copper sulfate.

A violet dyeing was obtained.

EXAMPLE 2

Cotton yarn was treated for 45 minutes at 35° C. at a goods-to-liquor ratio of 1:20 in an impregnation bath prepared as described below, then centrifuged, and while wet, developed first for some minutes at 20° C. and then, after being slowly heated to 90° C. to 95° C., for 20 to 30 minutes at this temperature in a developing bath prepared as described below. The yarn was then rinsed with a solution containing, per liter of water, 3 cc. of hydrochloric acid of 20° Bé., soaped first for 15 minutes at 60° C. and then for 15 minutes at 95° C. with a solution containing, per liter of water, 1 gram of a reaction product from about 10 mols of ethylene oxide and 1 mol of isododecylphenol, and 3 grams of sodium carbonate, rinsed and dried.

Impregnation Bath 1.75 grams of 2-(2'.3'-hydroxynaphthoylamino)-naphthalene were dissolved in 3.5 cc. of denatured ethyl alcohol, 0.9 cc. of sodium hydroxide solution of 38° Bé., 2 cc. of warm water and 0.9 cc. of a formaldehyde solution of 33% strength. The solution so obtained was then made up to 1 liter with water at 95° C., 3 grams of a condensation product from fatty acids of high molecular weight and protein degradation products, and 10 cc. of sodium hydroxide solution of 38° Bé.

Developing Bath 1.61 grams of 7-amino-2.5-dimethyl-benzimidazole were diazotized with 4 cc. of hydrochloric acid of 20° Bé. and 4 cc. of a sodium nitrite solution in a proportion of 1:5 and the diazo solution so prepared was introduced into a bath containing, per liter of water, 2 grams of a reaction product of about 20 mols of ethylene oxide and 1 mol of octadecyl alcohol, 1.5 cc. of acetic acid of 50% strength, 7 grams of sodium acetate and 1.8 grams of copper sulfate·5H$_2$O.

A brownish currant dyeing was obtained.

By using in the above Example 1.7 grams of cobalt(II)-chloride·6H$_2$O instead of 1.8 grams of copper sulfate·5H$_2$O, a currant dyeing was obtained. By using 1.25 grams of manganese(II)-chloride there was obtained a garnet dyeing, with 2.75 grams of iron(III)-chloride a brownish garnet dyeing and with 2.75 grams of zinc sulfate a claret dyeing.

EXAMPLE 3

Cotton yarn was treated for 45 minutes at 35° C. at a goods-to-liquor ratio of 1:20 in an impregnation bath prepared as described below, then centrifuged, and while wet, developed for 30 minutes at 20° C. in a developing bath prepared as described below. The yarn was then rinsed with a solution containing, per liter of water, 3 cc. of hydrochloric acid of 20° Bé., then soaped for 20 minutes at 95° C. with a solution containing, per liter of water, 1 gram of a reaction product from about 10 mols of ethylene oxide and 1 mol of isododecylphenol, 1 gram of sodium carbonate, 2.5 grams of copper sulfate·5H$_2$O and 7.5 grams of triethanolamide, rinsed and dried.

Impregnation Bath 1.4 grams of 2-(2'.3'-hydroxynaphthoylamino)-3-methoxy-diphenylene oxide were dissolved in 2.8 cc. of denatured ethylene alcohol, 0.7 cc. of sodium hydroxide solution of 38° Bé. and 2 cc. of warm water. The solution so obtained was then made up to 1 liter with water at 35° C., 3 grams of a condensation product from fatty acids of high molecular weight and protein degradation products and 10 cc. of sodium hydroxide solution of 38° Bé.

Developing Bath 1.47 grams of 7-amino-5-methyl-benzimidazole in the form of a diazonium compound prepared in the usual manner were dissolved in 1 liter of water containing 2 grams of a reaction product from about 20 mols of ethylene oxide and 1 mol of octadecyl alcohol, 3 cc. of acetic acid of 50% strength and 10 grams of sodium acetate.

A brownish currant dyeing was obtained.

EXAMPLE 4

18.2 parts of 7-amino-2-methyl-6-chlorobenzimidazole were dissolved in 200 parts by volume of water and 50 parts by volume of 5N-hydrochloric acid and diazotized at 10° C. with 20 parts by volume of a 5 N-sodium nitrite solution. The yellowish red diazo solution so obtained was coupled at 30° C. to 40° C. with a suspension prepared from 27.2 parts of 2.3-hydroxynaphthoylaminobenzene of 96.8% strength in 1000 parts by volume of water, 120 parts by volume of a 2 N-sodium carbonate solution and 1 part of a dispersing agent.

After the coupling, a solution containing 30 parts of crystallized copper sulfate, in 150 parts by volume of water and 50 parts of triethanolamine was added and the whole was stirred for some hours at 90° C. to 95° C. After the metallization the complex copper compound formed was filtered off with suction in the hot, washed with water and little methylalcohol and dried. The dyestuff so obtained was a dark violetish powder.

By using in the above example 33 parts of crystallized cobalt sulfate or 33 parts of crystallized nickel sulfate and 25 parts of aminoacetic acid instead of 30 parts of copper sulfate and 50 parts of triethanolamine, a complex cobalt compound or a complex nickel compound of the dyestuff was obtained in the form of dark colored powders.

EXAMPLE 5

Cotton yarn was treated for 45 minutes at 35° C. at a goods-to-liquor ratio of 1:20 in an impregnation bath prepared as described below, then centrifuged, and while wet, developed first for some minutes at 20° C. and then, after being slowly heated to 95° C., for 20 to 30 minutes at 90° C. to 95° C. in a developing bath prepared as described below. The yarn was then rinsed with a solution containing, per liter of water, 3 cc. of hydrochloric acid of 20° Bé. soaped first for 15 minutes at 60° C. and then for 15 minutes at 95° C. with a solution containing, per liter of water, 1 gram of a reaction product from about 10 mols of ethylene oxide and 1 mol of isododecylphenol and 3 grams of sodium carbonate, rinsed and dried.

*Impregnation Bath*

1.75 grams of 2-(2′.3′-hydroxynaphthoylamino)-naphthalene were dissolved in 3.5 cc. of denature ethyl alcohol, 0.9 cc. of sodium hydroxide solution of 38° Bé., 2 cc. of warm water and 0.9 cc. of a formaldehyde solution of 30% strength. The solution so obtained was then made up to 1 liter with water at 95° C., 3 grams of a condensation product from fatty acids of high molecular weight and protein degradation products, and 10 cc. of sodium hydroxide solution of 38° Bé.

*Developing Bath*

1.5 grams of 7-amino-5-methyl-benztriazole in the form of a diazonium compound prepared in the usual manner were dissolved in 1 liter of water containing 2 grams of a reaction product from about 20 mols of ethylene oxide and 1 mol of octadecylalcohol, 3 cc. of acetic acid of 50% strength, 10 grams of sodium acetate and 2.5 grams of copper sulfate.

A currant dyeing having a very good fastness to light was obtained.

By using in the above example 2.4 grams of cobalt (II)-chloride or 2.8 grams of nickel sulfate instead of 2.5 grams of copper sulfate, garnet dyeings were obtained. By using 2.7 grams of iron(III)-chloride, a brownish garnet dyeing was obtained.

EXAMPLE 6

Cotton yarn was treated for 45 minutes at 35° C. at a goods-to-liquor ratio of 1:20 in an impregnation bath prepared as described below, then centrifuged, and while wet, developed for 30 minutes at 20° C. in the developing bath prepared as described below. Then yarn was then rinsed with a solution contining, per liter of water, 3 cc. of hydrochloric acid of 20° Bé., soaped for 20 minutes at 95° C. with a solution containing, per litter of water, 1 gram of a reaction product from about 10 mols of ethylene oxide and 1 mol of isododecylphenol, 1 gram of sodium carbonate, 2.5 grams of copper sulfate·5H₂O and 7.5 grams of triethanolamine, rinsed and dried.

*Impregnation Bath*

1.4 grams of 2-(2′,3′-hydroxynaphthoylamino)-3-methoxy-diphenylene oxide were dissolved in 2.8 cc. of denatured ethyl alcohol, 0.7 cc. of sodium hydroxide solution of 38° Bé. and 2 cc. of warm water. The solution so obtained was then made up to 1 liter with water at 35° C., 3 grams of a condensation product from fatty acids of high molecular weight and protein degradation products, and 10 cc. of sodium hydroxide solution of 38° Bé.

*Developing Bath*

1.5 grams of 7-amino-5-methyl-benzitriazole in the form of a diazonium compound prepared in the usual manner were dissolved in 1 liter of water containing 2 grams of a reaction product from about 20 mols of ethylene oxide and 1 mol of octadecyl alcohol, 3 cc. of acetic acid of 50% strength and 10 grams of sodium acetate. A currant dyeing having a very good fastness to light was obtained.

EXAMPLE 7

8.93 parts of 7-amino-6-chlorobenzitriazole were introduced into 20.4 parts of sulfuric acid of 96% strength while stirring well. Then 16 parts of nitrosyl sulfuric acid of 40% strength were added. After some minutes the solution was poured on to ice and the diazo solution so obtained was coupled at 50° C. with a suspension of 2.3-hydroxynaptholaminobenzene prepared as follows:

13.15 parts of 2.3-hydroxynaphthoylaminobenzene were dissolved in 20 parts by volume of dentured alcohol and 30 parts by volume of a 5 N-sodium hydroxide solution, diluted with 100 parts by volume of water and introduced into a mixture containing 1000 parts by volume of water, 15 parts by volume of acetic acid and 1 part of a reaction product from about 20 mols of ethylene oxide and 1 mol of oleyl alcohol. A solution containing 140 parts of sodium acetate and 500 parts by volume of water was then added. After the coupling, the solution was neutralized and a solution containing 12.5 parts of copper sulfate, 45 parts of triethanolamine and 200 parts by volume of water was added.

The solution was then heated to 95° C. and treated for 2 hours at that temperature. The complex copper compound of the dyestuff formed was filtered off with suction, washed and dried. A dark powder was obtained.

In the following table further components are listed which can be used in the process of the invention, and the tints produced by forming the metalliferous azo-dyestuffs from these components on the fibers, which tints possess good fastness properties.

| Diazo component | Coupling component | Tint | | |
|---|---|---|---|---|
| | | copper complex | cobalt complex | nickel complex |
| 7-amino-2.5-dime-thyl-benzimid-azole | β-naphthol | violet | bluish garnet. | claret. |
| Do | 2-chloro-1-naphthol | dark brown | brownish currant. | brownish currant. |
| Do | 4-chloro-1-naphthol | blackish currant. | do | brownish garnet. |
| Do | resorcine | bluish red brown. | bluish grey brown. | yellowish brown. |
| Do | 3-hydroxydiphenylene oxide | grey blue | greenish grey blue. | reddish grey blue. |
| Do | terephthaloyl-bis-resorcine | red brown | bluish garnet. | red brown. |
| Do | p-cresol | bluish grey brown. | reddish grey brown. | bluish grey brown. |
| Do | 2.6-dihydroxy-naphthalene | yellowish brown. | yellowish brown. | yellowish brown. |
| Do | 3-hydroxydiphenyl-amine | blackish currant. | currant | bluish red brown. |
| Do | 2,hydroxycarbazole | brownish violet. | brownish red violet. | bluish grey brown. |
| Do | 2.4-dihydroxybenzo-phenone | brown red | bluish brown red. | red brown. |
| Do | 3-hydroxycarbazole | bluish grey brown. | reddish grey brown. | greenish grey brown. |
| Do | p-chlorophenol | yellowish red brown. | red violet | reddish grey brown. |
| 7-amino-4.6-dichlorobenztriazole | β-naphthol | grey brown | reddish grey. | Do. |
| Do | 2-chloro-1-naphthol | yellowish grey brown. | grey brown | yellowish grey brown. |
| Do | 4-chloro-1-naphthol | khaki | reddish grey brown. | Do. |

| Diazo component | Coupling component | Tint | | |
|---|---|---|---|---|
| | | copper complex | cobalt complex | nickel complex |
| 7-amino-4.6-dichlorobenztriazole | resorcine | yellow brown | red brown | yellow brown |
| Do | 3-hydroxydiphenylene oxide | yellowish grey brown | reddish grey brown | yellowish grey brown |
| Do | terephthaloyl-bis-resorcine | yellow brown | red brown | yellow brown |
| Do | p-cresol | do | reddish brown | Do. |
| Do | 2.6-dihydroxynaphthalene | yellowish brown | do | yellowish brown |
| Do | 3-hydroxydiphenylamine | brownish grey | grey blue | brownish violet |
| Do | 2-hydroxycarbazole | do | reddish blue grey | red violet |
| Do | 2.4-dihydroxybenzophenone | yellowish brown | grey brown | reddish grey brown |
| Do | 3-hydroxycarbazole | yellow brown | do | yellow brown |
| Do | p-chlorophenol | do | yellowish grey brown | Do. |
| 7-amino-2.5-dimethyl-benzimidazole | 2.3-hydroxynaphthoylaminobenzene | brownish violet | currant | |
| 7-amino-2.5-dimethyl-benzimidazole | 1-(2',3'-hydroxynaphthoylamino)-3-nitrobenzene | do | currant | |
| Do | 1-(2',3'-hydroxynaphthoylamino)-naphthalene | brownish currant | do | |
| Do | 1-(2',3'-hydroxynaphthoylamino)-2-methoxy-4-chloro-5-methylbenzene | do | do | |
| Do | 1-(2',3'-hydroxynaphthoylamino)-2-methyl-4-chlorobenzene | do | do | |
| Do | 1-(2',3'-hydroxynaphthoylamino)-2.4-dimethoxy-5-chlorobenzene | currant | brownish currant | |
| Do | 1-(2'-hydroxycarbazole-3'-carboylamino)-4-chlorobenzene | | brownish violet | |
| Do | 1-(2'-hydroxyanthracene-3'-carboylamino)-2-methylbenzene | | blue grey | |
| Do | 2-(2',3'-hydroxynaphthoylamino)-3-methoxy-diphenylene oxide | brownish currant | brownish currant | |
| Do | 1-(5'-hydroxy-1'.2'-1''.2''-benzocarbazole-4'-carboylamino)-4-methoxybenzene | | black | |
| Do | 1-(2',3'-hydroxynaphthoylamino)-2-methyl-5-chlorobenzene | brownish currant | brownish currant | |
| Do | 1-(2',3'-hydroxynaphthoylamino)-4-ethoxybenzene | do | do | |
| 7-amino-5-methyl-benzimidazole | 1-(2',3'-hydroxynaphthoylamino)-4-methoxybenzene | do | do | red violet |
| Do | 1-(2',3'-hydroxynaphthoylamino)-2-methoxybenzene | do | do | violet |
| Do | 1-(2',3'-hydroxynaphthoylamino)-2-methyl benzene | do | do | Do. |
| Do | 1-(2',3'-hydroxynaphthoylamino)-4-chlorobenzene | do | do | red violet |
| Do | 1-(2',3'-hydroxynaphthoylamino)-2-methyl-4-methoxybenzene | do | do | claret |
| Do | 1-(2',3'-hydroxynaphthoylamino)-2.5-dimethoxy-4-chlorobenzene | do | do | violet |
| Do | 1-(2',3'-hydroxynaphthoylamino)-2.5-dimethoxybenzene | do | do | Do. |
| Do | 4.4'-bis-(2'',3''-hydroxynaphthoyl-amino)-3.3'-dimethoxydiphenyl | | reddish dark brown | reddish dark brown |
| Do | 1-(2',3'-hydroxynaphthoylamino)-2-ethoxybenzene | brownish currant | brownish currant | violet |
| Do | 1-(6'-bromo-2' 3'-hydroxynaphthoylamino)-2-methoxybenzene | do | do | Do. |
| Do | 1-(5'-hydroxy-1' 2'-1''. 2''-benzocarbazole-4'-carboylamino)-4-methoxybenzene | | black | black |
| Do | 1-(2' 3'-hydroxynaphthoylamino)-2-methoxy-5-chlorobenzene | brownish currant | brownish currant | violet |
| Do | 1-(2' 3'-hydroxynaphthoylamino)-4-methylbenzene | do | do | claret |
| Do | 1-(2' 3'-hydroxynaphthoylamino)-2.4-dimethylbenzene | do | do | Do. |
| Do | 1-(2' 3'-hydroxynaphthoylamino)-2.3-dimethylbenzene | do | do | Do. |
| 7-amino-5 6-dimethoxy-benzimidazole | 2-(2' 3'-hydroxynaphthoylamino)-naphthalene | garnet | do | brownish garnet |
| Do | 1-(2' 3'-hydroxynaphthoylamino)-2.4-dimethoxy-5-chlorobenzene | do | currant | garnet |
| 7-amino-2-methyl-6-chloro-benzimidazole | 2-(2' 3'-hydroxynaphthoylamino)-naphthalene | do | claret | claret |
| Do | 1-(2'-hydroxycarbazole-3'-carboylamino)-4-chlorobenzene | middle brown | middle brown | middle brown |
| 7-amino-6-chlorobenzimidazole | 1-(2' 3'-hydroxynaphthoylamino)-2-methoxybenzene | brown currant | brown currant | red violet |
| Do | 1-(2' 3'-hydroxynaphthoylamino)-2.5-dimethoxybenzene | do | do | Do. |
| Do | 1-(2' 3'-hydroxynaphthoylamino)-2.4-dimethoxy-5-chlorobenzene | do | do | Do. |
| 7-amino-4.6-dichloro-benzimidazole | 2-(2',3'-hydroxynaphthoylamino)-naphthalene | dark violet | dark violet | purple |
| Do | 1-(2',3'-hydroxynaphthoylamino)-2.4-dimethoxy-5-chlorobenzene | do | do | Do. |
| Do | 1-(2'-hydroxycarbazole-3'-carboylamino)-4-chlorobenzene | do | do | dark violet |
| Do | 1-(2'-hydroxyanthracene-3'-carboylamino)-2-methylbenzene | dark green | blue green | dark green |
| Do | 1-(5'-hydroxy-1',2'-1''.2''-benzocarbazole-4'-carboylamino)-4-methoxybenzene | violet grey | violet grey | violet grey |
| Do | terephthaloyl-bis-(1-acetylamino-2.4-dimethoxy-5-chlorobenzene) | olive brown | copper red | yellow brown |
| 7-amino-5-methyl-benztriazole | 2.3-hydroxynaphthoylaminobenzene | currant | | |
| Do | 1-(2',3'-hydroxynaphthoylamino)-3-nitrobenzene | do | | |

| Diazo component | Coupling component | Tint | | |
|---|---|---|---|---|
| | | copper complex | cobalt complex | nickel complex |
| 7-amino-5-methyl-benztriazole | 1-(2′.3′-hydroxynaphthoylamino)-naphthalene. | currant | | |
| Do | 1-(2′.3′-hydroxynaphthoylamino)-2-methoxy-4-chloro-5-methylbenzene. | do | | |
| Do | 1-(2′.3′-hydroxynaphthoylamino)-2-methoxybenzene. | do | | |
| Do | 1-(2′.3′-hydroxynaphthoylamino)-2-methylbenzene. | do | | |
| Do | 1-(2′.3′-hydroxynaphthoylamino)-4-chlorobenzene. | do | | |
| Do | 1-(2′.3′-hydroxynaphthoylamino)-2-methyl-4-chlorobenzene. | do | | |
| Do | 1-(2′.3′-hydroxynaphthoylamino)-2-methyl-4-methoxybenzene. | do | | |
| Do | 1-(2′.3′-hydroxynaphthoylamino)-2.4-dimethoxy-5-chlorobenzene. | do | | |
| Do | 1-(2′.3′-hydroxynaphthoylamino)-2.5-dimethoxy-4-chlorobenzene. | do | | |
| Do | 1-(2′.3′-hydroxynaphthoylamino)-2.5-dimethoxybenzene. | do | | |
| Do | 1-(6′-bromo-2′.3′-hydroxynaphthoylamino)-2-methoxybenzene. | do | | |
| Do | 1-(2′.3′-hydroxynaphthoylamino)-2-methyl-5-chlorobenzene. | do | | |
| Do | 1-(2′.3′-hydroxynaphthoylamino)-2-methoxy-5-chlorobenzene. | do | | |
| Do | 1-(2′.3′-hydroxynaphthoylamino)-4-ethoxybenzene. | do | | |
| 7-amino-6-chloro-benztriazole | 2-(2′.3′-hydroxy-naphthoylamino)-naphthalene. | blue violet | purple | purple. |
| Do | 1-(2′.3′-hydroxy-naphthoylamino)-2.4-dimethoxy-5-chlorobenzene. | dark violet | do | Do. |
| Do | 1-(2′-hydroxycarbazole-3′-carboylamino)-4-chloro-benzene. | violet | violet | violet. |
| Do | 1-(2′-hydroxyanthracene-3′-carboylamino)-2-methylbenzene. | blue green | blue green | blue green. |
| Do | 1-(5′-hydroxy-1′.2′-1″.2″-benzocarbazole-4′-carboylamino)-4-methoxy-benzene. | currant | currant | currant. |
| Do | terephthaloyl-bis-(1-acetylamino-2.4-dimethoxy-5-chlorobenzene). | copper red | copper red | copper red. |
| 7-amino-4.6-dichloro-benztriazole | 2.3-hydroxynaphthoylaminobenzene | blue black | navy blue | blue violet. |
| 7-amino-5-chloro-benzimidazole | 2.3-hydroxynaphthoylaminobenzene | garnet | | claret. |
| Do | 2-(2′.3′-hydroxy-naphthoylamino)-napthalene. | do | | Do. |
| Do | 1-(2′.3′-hydroxy-naphthoylamino)-3-nitrobenzene. | do | | Do. |
| Do | 1-(2′.3′-hydroxy-naphthoylamino)-4-chlorobenzene. | do | | Do. |
| Do | 1-(2′-hydroxycarbazole-3′-carboylamino)-4-chlorobenzene. | reddish blue | | currant. |
| Do | 1-(2′-hydroxyanthracene-3′-carboylamino)-2-methylbenzene. | | blue green | |
| Do | 1-(5′-hydroxy-1′.2′-1″.2″-benzocarbazole-4′-carboylamino)-4-methoxy-benzine. | | black | |
| 7-amino-5-methyl-6-chloro-benztriazole | 1-(2′.3′-hydroxy-naphthoylamino)-3-nitrobenzene. | reddish dark blue. | violet currant. | |
| Do | 2-(2′.3′-hydroxy-naphthoylamino)-naphthalene. | do | do | |
| 7-amino-5-chloro-benztriazole | 2.3-hydroxynapthoylaminobenzene | currant | garnet | garnet. |
| Do | 1-(2′.3′-hydroxy-napthoylamino)-3-nitrobenzene. | do | do | Do. |
| Do | 2-(2′.3′-hydroxy-naphthoylamino)-naphthalene. | do | do | Do. |
| Do | 1-(2′.3′-hydroxy-naphthoylamino)-2-methyl-4-chlorobenzene. | do | do | Do. |
| Do | 1-(2′.3′-hydroxy-naphthoylamino)-2.4-dimethoxy-5-chlorobenzene. | do | do | Do. |
| Do | 1-(2′.3′-hydroxy-naphthoylamino)-2-methoxybenzene. | do | do | Do. |
| Do | 1-(2′-hydroxycarbazole-3′-carboylamino)-4-chlorobenzene. | reddish blue | reddish blue | currant. |
| Do | 1-(2′-hydroxyanthracene-3′-carboylamino)-2-methylbenzene. | blue green | blue green | blue green. |
| Do | 1-(5′-hydroxy-1′.2′-1″.2″-benzocarbazole-4′-carboylamino)-4-methoxybenzene | bluish black | black blue | greenish black. |
| 7-amino-6-trifluoromethyl-benztriazole | 2-(2′.3′-hydroxynaphthoylamino)-naphthalene. | currant | garnet | bluish garnet |
| 7-amino-2-n-propyl-5-methylbenzimidazole | 1-(2′.3′-hydroxynaphthoylamino)-2-methyl-4-chlorobenzene. | do | currant | claret. |
| 7-amino-5-methoxy-benzimidazole | 1-(2′.3′-hydroxynaphthoylamino)-2.4-dimethoxy-5-chlorobenzene. | red violet | red violet | red violet. |
| 7-amino-4.6-dichloro-benztriazole | 1-(2′-hydroxycarbazole-3′-carboylamino)-4-chlorobenzene. | reddish blue | | |
| Do | 1-(2′-hydroxyanthracene-3′-carboylamino)-2-methylbenzene. | bluish green | | |
| Do | 1-(5′-hydroxy-1′.2′-1″.2″-benzocarbazole-4′-4′-carboylamino)-4-methoxybenzene. | blue black | | |
| 7-amino-5-methoxy-benzimidazole | 2.3-hydroxynaphthoylaminobenzene | currant | blackish currant. | currant. |
| Do | 1-(2′.3′-hydroxynaphthoylamino)-3-nitrobenzene. | do | do | Do. |
| Do | 2-(2′.3′-hydroxynaphthoylamino)-naphthalene. | do | do | Do. |
| Do | 1-(2′.3′-hydroxy-naphthoylamino)-4-chlorobenzene. | do | do | Do. |
| Do | 1-(2′.3′-hydroxy-naphthoylamino)-2-methyl-4-chlorobenzene. | do | do | currant. |
| 7-amino-benztriazole | 1-(2′.3′-hydroxy-naphthoylamino)-3-nitrobenzene. | garnet | brownish violet. | garnet. |
| Do | 2-(2′.3′-hydroxy-naphthoylamino)-napthalene. | do | do | Do. |

| Diazo component | Coupling component | Tint | | | | |
|---|---|---|---|---|---|---|
| | | copper complex | cobalt complex | nickel complex | iron complex | zinc complex |
| 7-amino-4.6-dichlorobenztriazole | 1-(2′.3′-hydroxynaphthoylamino)2.4-dimethoxy-5-chlorobenzene. | dark blue. | dark blue. | dark blue. | brown garnet. | dark blue. |
| Do | 2-(2′.3′-hydroxynaphthoylamino)-naphthalene. | do | do | do | garnet | dark blue currant. |

We claim:

1. A complex metal compound containing a metal selected from the group consisting of copper, cobalt, nickel, iron and zinc of an azo-dyestuff free of groups imparting solubility in water and having the formula

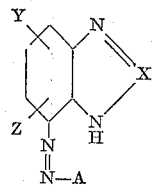

wherein X is a member selected from the group consisting of a nitrogen atom, the group CH and the group C-(lower)alkyl, Y is a member selected from the group consisting of a hydrogen atom, a chlorine atom, a methyl and methoxy group, Z is a member selected from the group consisting of a hydrogen atom, a chlorine atom, a lower alkyl group, a methoxy group and a trifluoromethyl group, and A stands for a radical of a coupling component of the group consisting of 1,3-dihydroxybenzene, 2-hydroxynaphthalene, 2,6-dihydroxynaphthalene, 3-hydroxy-diphenylene oxide, hydroxycarbazole, p-chlorophenol, p-cresol, 3-hydroxydiphenylamine, 2,4-dihydroxybenzophenone, 2-hydroxynaphthalene-3-carboxylic acid arylamide, 6-bromo-2-hydroxynaphthalene-3-carboxylic acid arylamide, 2-hydroxycarbazole-3-carboxylic acid arylamide, 5-hydroxy-1,2,1′,2′-benzocarbazole-4-carboxylic acid arylamide and 2-hydroxyanthracene-3-carboxylic acid arylamide, said radical being coupled in a position adjacent to a hydroxy group.

2. The copper complex compound of the water-insoluble azo-dyestuff having the formula

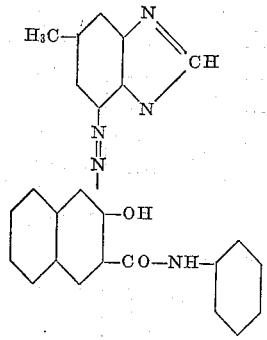

3. The copper complex compound of the water-insoluble azo-dyestuff having the formula

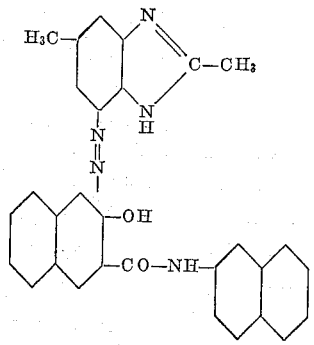

4. The copper complex compound of the water-insoluble azo-dyestuff having the formula

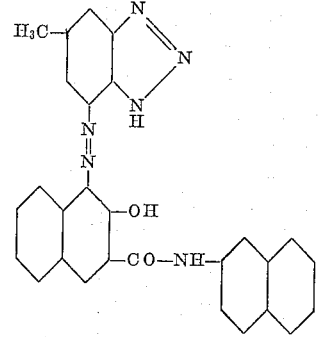

5. The nickel complex compound of the water-insoluble azo-dyestuff having the formula

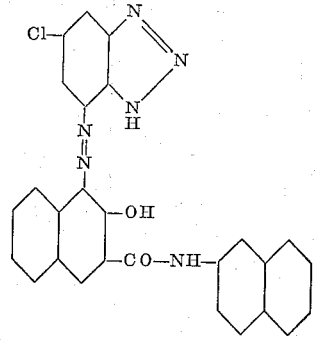

6. The nickel complex compound of the water-insoluble azo-dyestuff having the formula

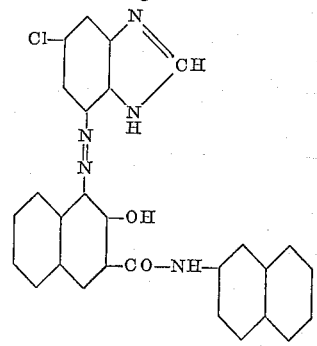

References Cited in the file of this patent

UNITED STATES PATENTS

| 1,667,667 | Laska et al. | Apr. 24, 1928 |
| 2,109,552 | Schindhelm et al. | Mar. 1, 1938 |
| 2,315,220 | Petitcolas | Mar. 30, 1943 |
| 2,475,506 | Lewis | July 5, 1949 |
| 2,479,944 | Lewis | Aug. 23, 1949 |
| 2,795,575 | Sureau | June 11, 1957 |

FOREIGN PATENTS

| 458,843 | Great Britain | Dec. 28, 1936 |

OTHER REFERENCES

Beilstein Organische Chemie, Vol. XXVI, page 323, Aug. 7, 1939.

Beilstein Organische Chemie, vol. XXVI, second edition, page 180, Jan. 10, 1955.